Patented Nov. 14, 1944

2,362,886

UNITED STATES PATENT OFFICE

2,362,886

DISULPHONAMIDES HAVING QUATERNARY AMMONIUM SALT GROUPS

Donald Drake Coffman and John Carl Sauer, Wilmington, Del., assignors to E. I. du Pont de Nemours & Company, Wilmington, Del., a corporation of Delaware No Drawing. Application August 1, 1940, Serial No. 349,253

1 Claim. (Cl. 260—295)

This invention relates to new quaternary ammonium compounds containing sulphonamide groups.

This invention has as an object the provision of a process for the preparation of new organic compounds. A further object comprises the new compounds. Another object is the preparation of new compounds for imparting water repellence to fabrics so treated. Other objects will appear hereinafter.

These objects are accomplished by the following invention of diamides of disulphonic acids having a quaternary ammonium halide group attached, through a single methylene group, to each sulphonamide nitrogen and having at least ten carbon atoms in the divalent organic radical joining the methylene quaternary ammonium halide groups, and the preparation of the same by the reaction of a tertiary amine having not more than one valence attached to aromatic carbon, formaldehyde, a hydrohalogen acid, and a disulphonamide having at least ten aliphatic carbon atoms and having at least one hydrogen on each sulphonamide nitrogen.

In the preferred practice of this invention, disulphonamides, either unsubstituted or N,N'-disubstituted, are prepared conveniently by the reaction of a disulphonyl chloride with a primary amine or ammonia. These are reacted with paraformaldehyde and an anhydrous hydrohalogen acid to produce the halomethyl derivative by introducing anhydrous hydrohalogen acid into a solution or suspension of the disulphonamide and paraformaldehyde in an inert solvent, e. g., benzene, with continuous stirring of the reaction mixture, the temperature being maintained at 50 to 60° C., the water formed during the reaction being separated from the benzene layer, and the benzene and excess hydrohalogen acid dissolved therein removed under reduced pressure at a temperature of 50 to 60° C., and the resulting halomethyl derivative is condensed with a tertiary amine in the cold, (e. g. 15–45° C.) either in the presence or absence of a solvent. When pyridine is used, an excess is added so that a homogeneous solution will result, and the excess pyridine can be removed at low temperatures under reduced pressure.

The more detailed practice of the invention is illustrated by the following examples, wherein parts given are by weight. There are of course many forms of the invention other than these specific embodiments.

Example I

N,N'-dioctadecylethanedisulphonamide is prepared by adding, with continuous stirring, octadecylamine (235 parts) in anhydrous ether (72 parts) to ethanedisulphonyl chloride (68 parts) in anhydrous benzene (240 parts). Considerable heat is evolved, and it is necessary to cool the reaction vessel. The solvent is removed from the reaction mixture and the resulting solid is recrystallized from ethanol and finally from ethanol-n-butanol mixture. The yield of purified N,N'-dioctadecylethanedisulphonamide is 40%. It analyzes for 8.3% sulphur and 3.96% nitrogen whereas the values calculated for $C_{38}H_{80}S_2O_4N_2$ are 9.2% sulphur and 4.2% nitrogen.

The introduction of the quaternary ammonium halide groups is accomplished as follows: To N,N'-dioctadecylethanedisulphonamide (130 parts) in dry benzene (880 parts) is added paraformaldehyde (22.8 parts; 4 equivalents). The mixture is stirred at 50-60° C. for 2.5 hours while a stream of dry hydrogen chloride is bubbled through the reaction mixture. After separating the water layer, the benzene is removed at 40° C. under diminished pressure. To the di(chloromethyl) derivative is added pyridine (300 parts), and a clear homogeneous solution results. Part of the excess pyridine is removed under reduced pressure and the remainder removed by drying in a drier over phosphorus pentoxide. The crude ethane-1,2-bis-(N-octadecylsulphonamidomethylpyridinium chloride) has a chlorine content of 6.9% whereas the theory for $C_{50}H_{94}S_2O_4N_4Cl_2$ is 7.5% chlorine.

A portion of the product is analyzed for "active ingredient" content by the following method. To a weighed sample of the product is added ice and methanol and the cold solution is titrated with standard alkali immediately. This analysis determines what portion of the chlorine is present as pyridine hydrochloride. A second weighed sample dissolved in methanol is heated at reflux temperature from 3 to 24 hours and titrated with alkali. The heating step converts all the quaternary ammonium salt to pyridine hydrochloride and subsequent titration with standard alkali gives the total chlorine content. The difference between the total halogen content and the chlorine present as pyridine hydrochloride gives the "active ingredient" content. In this case it was 53%.

The water-repelling agent (5 parts) is pasted with ethanol (6 parts) at 40–43° C. Water (90 parts) at 40-43° C. is added with stirring, and sodium acetate (2 parts) in water (4 parts) at 40-43° C. is added to produce a pH of about 5. A piece of cotton jean cloth is dipped into the solution, squeezed through rollers and the process repeated. The wet cloth weighs approximately twice its dry weight. It is then dried by circulating warm, dry air over it, and finally baked at 150° C. for five minutes. As judged by the spray test, this agent imparts a repellency to the fabric of 60 before laundering and of 70 after laundering.

A cloth having a repellency of 100 will, when inclined at a 45° angle, completely repel 250 cc. of water at 80° F. sprayed from a height of 6 inches, and no water will cling to the cloth. A repellency of 90 means that a few drops of water will cling to the cloth, but can be completely removed by shaking. A repellency of 50 means that the upper surface of the cloth is wetted during the test, but the water does not penetrate the cloth. The laundering treatment consists in boiling the sample in a 0.1% soap solution for one hour, rinsing thoroughly and drying.

*Example II*

A mixture of N,N'-dieicosylbenzene-1,3-disulphonamide and N,N'-didocosylbenzene-1,3-disulphonamide is prepared in the following manner: A commercial mixture of eicosenoic acid and docosenoic acid is converted to the corresponding nitriles and hydrogenated in the presence of ammonia. To b e n z e n e-1,3-disulphonyldichloride (275 parts) in anhydrous benzene (960 parts) is added with continuous stirring the mixture of eicosylamine (75%) and docosylamine (25%) (616 parts) in ether (216 parts). After all the amine is added, sodium hydroxide (80 parts) in water (240 parts) is added and the stirring continued for 0.5 hour. The reaction mixture is cooled occasionally with an external ice bath. The water layer is separated from the benzene layer and after the solvent is removed the reaction product, a mixture of N,N'-dieicosylbenzene-1,3-disulphonamide and N,N'-didocosylbenzene-1,3-disulphonamide, is recrystallized from ethanol.

The introduction of the quaternary ammonium halide groups is performed in the following manner. To the mixture of the disubstituted N,N'-benzene-1,3-disulphonamides (270 parts) in dry benzene (1360 parts) is added paraformaldehyde (22 parts). The mixture is stirred at 50-60° C. for 2.5 hours while a stream of dry hydrogen chloride is bubbled through the reaction mixture. After the water layer is separated, the benzene is removed at 40° C. under diminished pressure. It is then redissolved in fresh anhydrous benzene (660 parts) and the reaction flask is immersed in a cold water bath. Anhydrous trimethylamine is bubbled through the solution until an appreciable excess has been introduced. The benzene solvent and the excess trimethylamine is removed under reduced pressure from the mixture of benzene-1,3-bis-(N-e i c o sylsulphonamidomethyltrimethylammonium chloride) and benzene-1,3-bis-(N - docosylsulphonamidomethyltrimethylammonium chloride).

A portion of the product is analyzed for "active ingredient" content, and is found to have 64% "active ingredient."

The water-repelling agent (5 parts) is pasted with ethanol (6 parts) at 40-43° C. Water (90 parts) at 40-43° C. is added with stirring, and sodium acetate (2 parts) in water (4 parts) at 40-43° C. is added to produce a pH of about 5. A piece of cotton jean cloth is dipped into the solution, squeezed through rollers, and the process repeated. The wet cloth weighs approximately twice its dry weight. It is then dried by circulating warm dry air over it, and finally baked at 150° C. for 5 minutes. This agent imparts a repellency of 50 before laundering and repellency value of 50 after laundering.

*Example III*

N,N'-diisobutyldecane-1,10-d i s ulphonamide is prepared in the following manner. To decane-1.10-disulphonyl chloride (113 parts) in anhydrous benzene (480 parts) is added with continuous stirring isobutylamine (42 parts) in anhydrous benzene (128 parts). After all the amine is added, sodium hydroxide (28 parts) in water (120 parts) is added and the stirring continued for 0.5 hour. Occasionally the reaction flask is cooled by immersion in an ice water bath. The water layer is separated from the benzene layer, and after the organic solvent is removed from the reaction mixture, the N,N'-diisobutyldecane-1,10-disulphonamide is recrystallized from ethanol.

The preparation of decane-1,10-bis-(N-isobu t y l s ulphonamidomethyldimethylcyclohexylammonium chloride) is performed in the following manner. To N,N'-d i i sobutyldecane-1,10-disulphonamide (104 parts) in dry benzene (825 parts) is added paraformaldehyde (22 parts). The mixture is stirred at 50-60° C. for 2.5 hours while a stream of dry hydrogen chloride is bubbled through the reaction mixture. After separation of the water layer, the benzene is removed at 40° C. under diminished pressure. The decane-1,10-bis-(N-isobutylsulphonamidomethyl chloride is redissolved in anhydrous benzene (660 parts) and dimethylcyclohexylamine (85 parts) is added with stirring. The benzene is removed under reduced pressure at 40° C. from the decane-1,10-bis-(N-isobutyl sulphonamidomethyldimethylcyclohexylammonium chloride).

A portion of the product is analyzed for "active ingredient" content which is found to be 49%.

The water-repelling agent (5 parts) is pasted with ethanol (6 parts) at 40-43° C. Water (90 parts) at 40-43° C. is added with stirring, the sodium acetate (2 parts) in water (4 parts) at 40-43° C. is added to produce a pH of about 5. A piece of cotton jean cloth is dipped into the solution, squeezed through rollers, and the process repeated. The wet cloth weighs approximately twice its dry weight. It is then dried by circulating warm, dry air over it, and finally baked at 150° C. for 5 minutes. The agent imparts a repellency to the fabric of 60 before laundering, and a repellency of 50 after laundering.

The present invention is generic to N,N'-di-(haloquaternary ammonium)diamides of disulphonic acids, in which amides the quaternary nitrogens are separated from the amide nitrogens by a single methylene group, the sum of the aliphatic carbon atoms in the radicals between the methylene groups being at least 10, which are illustrated by the following formula

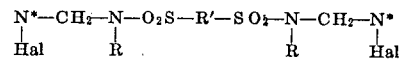

In the above general formula, the N*'s are quaternary ammonium nitrogen atoms. Hal is a halogen atom having an atomic weight of at least 35 and preferably less than 126. R' is a bivalent aliphatic, cycloaliphatic, arylalkyl, or aryl hydrocarbon radical; R can be hydrogen, alkyl, arylalkyl, aryl, or cycloaliphatic monovalent hydrocarbon radical, provided that the total number of aliphatic carbon atoms present in the R' and two R groups equals at least 10. When R is hydrogen R' must be an alkylene group containing 10 or more aliphatic carbon atoms, for example, decane-1-10-disulphonamide, tridecane-1,13-disulfonamide, and their higher homologs. These amides are formed by the reaction of the corresponding disulphonyl chlorides with ammonia. When R is an aryl group, as in the case of aniline or naphthylamine, R' has the same limitations as it has when R is hydrogen. When R is an aralkyl group, as for example benzylamine, R' must have at least 10–2n aliphatic carbon atoms, where $n$ represents the number of aliphatic carbon atoms in the two R groups. In the case of benzylamine, there is one aliphatic carbon atom present, therefore R' must contain at least eight aliphatic carbon atoms and preferably eight methylene groups. The disulphonyl chloride amidated with benzylamine must therefore be a disulphonyl chloride having at least eight aliphatic carbons, e. g., 1,8-octamethylenedisulphonyl chloride or one of its higher homologs. When R is either aliphatic or cycloaliphatic, R' must also have 10–2n aliphatic carbon atoms, where $n$ is the number of aliphatic carbon atoms in the radical R. When 2n is equal at least to 10, then R' can be a divalent aromatic group. To further illustrate, methanedisulphonyl chloride can be diamidated by reaction with pentylamine or its higher homologs, and the resulting sulphonamide used to prepare water-repellent agents. The reaction product from 1,2-ethanedisulphonyl chloride with n-butylamine or its higher homologs can be converted into N,N'-di(halo-quaternary ammonium)disulphonamides falling within the scope of the invention. Some of the disulphonyl chlorides which can be used to prepare amides (as long as the resulting disulphonamides contain at least 10 aliphatic carbon atoms as hereinbefore defined) are methanedisulphonyl chloride, ethane-1,2-disulphonyl chloride, propane-1,3-disulphonyl chloride, butane-1,4-disulphonyl chloride, pentane-1,5-disulphonyl chloride, hexane-1,6-disulphonyl chloride, heptane-1,7-disulphonyl chloride, octane-1,8-disulphonyl chloride, nonane-1,9-disulphonyl chloride, decane-1,10-disulphonyl chloride, hendecane-1,11-disulphonyl chloride, dodecane-1,12-disulphonyl chloride, tridecane-1,13-disulphonyl chloride, tetradecane-1,14-disulphonyl chloride, pentadecane-1,15-disulphonyl chloride, hexadecane-1,16-disulphonyl chloride, heptadecane-1,17-disulphonyl chloride, octadecane-1,18-disulphonyl chloride, nonadecane-1,19-disulphonyl chloride, eicosane-1,20-disulphonyl chloride, heneicosane-1,21-disulphonyl chloride, hentriacontane-1,31-disulphonyl chloride, 2-phenylhexane-1,6-disulphonyl chloride, 2-methylhexane-1,6-disulphonyl chloride, benzene-1,3-disulphonyl chloride, and cyclohexane-1,3-disulphonyl chloride.

Alkylene and aralkylene disulphonyl chlorides can be obtained in excellent yields by the reaction of the corresponding dihalide with sodium sulphite and subsequently reacting the resulting di-(sodium sulphonates) with phosphorus pentachloride. Accordingly, alkylene and arylalkylene dihalides constitute part of the raw materials, and can be obtained as follows: Methylene bromide can be formed by direct halogenation of methane; ethylene bromide is obtainable by the reaction of bromine on ethylene. Trimethylene glycol, tetramethylene glycol, pentamethylene glycol, hexamethylene glycol, heptamethylene glycol, undecamethylene glycol, dodecamethylene glycol, tridecamethylene glycol, bigesimethylene glycol, dobigesimethylene glycol, 3-methyl hexamethylene glycol, 3-phenyl hexamethylene glycol; and others are obtained by the sodium-alcohol reduction of the corresponding dibasic acid esters, with the ester groups being preferably methyl or ethyl. Certain catalytic hydrogenations of these esters also yield the same glycols. Reaction of these glycols with thionyl chloride, phosphorus trichloride, hydrogen bromide, or phosphorus tribromide yield the corresponding dihalides. p-Xylylene dichloride can be obtained by the reaction of paraformaldehyde and hydrogen chloride on benzyl chloride. As pointed out above, these dihalides can be converted into the corresponding sulphonic acid derivatives by reaction with sodium sulphite. Furthermore, the reaction of these dihalides with thiourea and subsequent reaction with aqueous chlorine yields the disulphonyl chlorides. Disulphonyl chlorides can also be obtained by the action of aqueous chlorine on the corresponding dithiols. Aromatic disulphonic acids can be obtained by direct sulphonation with fuming sulphuric acid, or by introducing two sulphonic acid groups on the aromatic nucleus by reaction of an aromatic compound with chlorosulphonic acid.

Ammonia and also the following primary amines can be used for amidating the disulphonyl chlorides: methylamine, ethylamine, propylamine, butylamine, pentylamine, hexylamine, heptylamine, octylamine, nonylamine, decylamine, hendecylamine, dodecylamine, tridecylamine, tetradecylamine, pentadecylamine, hexadecylamine, heptadecylamine, octadecylamine, nonadecylamine, eicosylamine, heneicosylamine, docosylamine, hexacosylamine, cyclopentylamine, cyclohexylamine, aniline, and naphthylamine. Aromatic primary amines can be obtained by the reduction of the corresponding aromatic nitro compounds. Primary aliphatic amines can also be obtained by the reaction of alkyl or aralkyl halides with ammonia. For example, benzylamine is obtained by the reaction of benzyl chloride and ammonia. The best method, however, for synthesizing primary amines is the hydrogenation of the nitrile in the presence of ammonia. By this method, octadecylamine, dodecylamine, and other long-chain amines can be easily prepared.

The disulphonamide is therefore one having two sulphonamide groups each having at least one hydrogen on sulphonamide nitrogen, the disulphonamide having a total of at least ten aliphatic carbon atoms. This is reacted with a tertiary amine, a hydrohalogen acid of molecular weight above 36 and preferably below 127 and formaldehyde.

The halogen in the hydrohalogen acid used in the synthesis must be limited to those having a molecular weight of at least 35 and preferably less than 126 because of the lower stability of the iodides. Hydrogen bromide and hydrogen chloride are therefore the preferred hydrohalogen acids.

The tertiary nitrogen of the tertiary amine employed in making the quaternary salt can be contained in one cyclic radical as in the case of pyridine; two of the bonds of the tertiary nitrogen can be satisfied by a cyclic radical while the third bond is occupied by a monovalent radical as in the case of N-methylpiperidine, or the three bonds of the tertiary nitrogen can be satisfied by three monovalent radicals. In the last case not more than one aromatic group can be attached to the nitrogen, for when two such groups are present an unstable quaternary salt is obtained, and when three such groups are present, quaternary salt formation does not occur. Thus any tertiary amine having not more than one valance of the nitrogen attached to aromatic carbon may be employed.

Tertiary amines containing an aryl group can be obtained by the action of an alcohol and acid on a primary aromatic amine, or the same product can be obtained by the reaction of the alkyl halides on the same primary aromatic amine. Several tertiary amines, the most important of which is pyridine, can be isolated from coal tar distillates. Aliphatic tertiary amines can be prepared from the alkyl halide and ammonia, or more preferably by the reaction of ammonia on aliphatic alcohol and a hydrogen halide acid. Tertiary amines may also be prepared by further alkylation of primary or secondary amines. Suitable tertiary amines for use in this process are pyridine, quinoline, N-methylpiperidine, N-ethylpiperidine, isoquinoline, nicotine, dimethylaniline, diethylaniline, dimethylbenzylamine, methylethylbenzylamine, trimethylamine, triethylamine, dimethylcyclohexylamine, dimethylpentylamine, dimethyloctadecylamine, dimethyldodecylamine, N-methylmorpholine, dimethylisopropylamine, and many others.

Formaldehyde is used in an anhydrous form preferably as paraformaldehyde. Instead of formaldehyde, trioxymethylene or polyoxymethylene can be used with equal success.

The synthesis of the halomethyl derivatives can be performed either in the presence or absence of a solvent, but reaction appears to progress more rapidly and more uniformly in the presence of a solvent. In the condensation of the N,N'-disubstituted disulphonamide with paraformaldehyde and anhydrous hydrohalogen acid, several restrictions limit the solvents employed. Nonhydroxylated, anhydrous, neutral organic liquids that are solvents for the reactants and preferably but not necessarily solvents for the reaction products are preferred. It is further desirable for the sake of convenience that the solvents be low boiling, e. g., boiling at 100° C. or less, although this is not absolutely necessary, for higher boiling solvents can be removed by distillation at low temperature under reduced pressure and/or by azeotropic distillation with a low boiling inert solvent. If the solvent employed during this condensation is halogenated, extreme care must be exercised to remove all of it, otherwise the portion remaining may form a quaternary ammonium salt during the subsequent reaction with a tertiary amine for the formation of the N,N'-di-(haloquaternary ammonium)disulphonamides. This can lead to erroneous conclusions about the behavior of the final product. Furthermore, the excess hydrohalogen acid either dissolves in the solvent or held by occlusion by the halomethyl derivative must be removed, generally under reduced pressure, otherwise it will react with the tertiary amine to form tertiary amine hydrohalide. Suitable solvents for the condensation of the disulphonamide, paraformaldehyde, and anhydrous hydrohalogen acid are: benzene, toluene, petroleum ether, diethyl ether, diisopropyl ether, dioxan, decalin, tetralin, and others.

The recommended temperature range for the condensation of the disulphonamide with paraformaldehyde and the anhydrous hydrohalogen acid is 40°–75° C. with the preferred range being 50–60° C. The reaction, however, will proceed at room temperature or lower, but the rate is rather slow. The reaction proceeds rapidly at temperatures above 75° C., but danger of side reactions such as, for example, the hydrolysis of amide groups is introduced. The reaction proceeds rapidly enough at 50–60° C. to make this operating temperature feasible.

In converting the halomethyl derivative to a quaternary ammonium derivative by reaction with a tertiary amine, if the tertiary amine is a comparatively low boiling liquid and is a solvent for the quaternary ammonium compound, as, for example, pyridine, an excess of the amine can be satisfactorily employed as a solvent for the product. If, however, the tertiary amine is very high boiling or is a solid, a solvent possessing the properties previously outlined may be used with advantage, and the calculated quantity or a slight excess of the tertiary amine added. An alternate process is to blow dry air or nitrogen through the solution of the halomethyl derivative, and when the excess hydrohalogen acid has been expelled, the tertiary amine can be added directly to this solution. Formation of the quaternary ammonium salt by the reaction of the halomethyl substituted product and the tertiary amine whose limitations have been outlined hereinbefore proceeds rapidly at low temperatures. In fact, high temperatures favor decomposition of the quaternary salt groups.

The products described in this invention are new compositions of matter and are particularly useful as durable water-repellent finishes for fabric. Furthermore, a permanent change in the hand of the fabric is effected when either an excess or an amount too small to produce water repellency is applied to fabric. When an amount of the material too small to produce repellency is applied, a permanent softening which is resistant to laundering is usually produced.

The above description and examples are intended to be illustrative only. Any modification of or variation therefrom which conforms to the spirit of the invention is intended to be included within the scope of the claim.

What is claimed is:

Ethane-1,2-bis - (N - octadecylsulphonamidomethyl-pyridinium chloride) having the formula

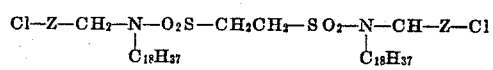

wherein the Z's are pyridinium radicals attached through nitrogen to the remainder of the molecule.

DONALD DRAKE COFFMAN.
JOHN CARL SAUER.